United States Patent
Kuroda et al.

(10) Patent No.: US 7,200,313 B2
(45) Date of Patent: Apr. 3, 2007

(54) METHOD FOR THE PREPARATION OF OPTICAL WAVEGUIDE DEVICES AND OPTICAL WAVEGUIDE DEVICES

(75) Inventors: Toshihiro Kuroda, Tsukuba (JP); Madoka Kondou, Tsukuba (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/872,553

(22) Filed: Jun. 22, 2004

(65) Prior Publication Data

US 2004/0228595 A1 Nov. 18, 2004

Related U.S. Application Data

(63) Continuation of application No. PCT/JP02/13668, filed on Dec. 26, 2002.

(30) Foreign Application Priority Data

Dec. 26, 2001 (JP) ............... 2001-393628

(51) Int. Cl.
*G02B 6/10* (2006.01)
*G02B 6/00* (2006.01)
*B29D 11/00* (2006.01)

(52) U.S. Cl. ............... 385/132; 385/129; 385/130; 385/141; 385/144; 264/1.24; 264/1.25

(58) Field of Classification Search ........ 385/129–132; 438/29, 31; 264/1.24–1.29; 65/385
See application file for complete search history.

(56) References Cited

U.S. PATENT DOCUMENTS

| | | | | |
|---|---|---|---|---|
| 5,348,841 A | * | 9/1994 | Tao et al. | 430/270.19 |
| 5,972,516 A | * | 10/1999 | Kaneko et al. | 428/429 |
| 6,088,492 A | * | 7/2000 | Kaneko et al. | 385/14 |
| 6,327,415 B1 | * | 12/2001 | Koyano et al. | 385/143 |
| 2002/0021883 A1 | * | 2/2002 | Koyano et al. | 385/143 |

FOREIGN PATENT DOCUMENTS

| | | |
|---|---|---|
| JP | 6-331845 | 12/1994 |
| JP | 6331845 | 12/1994 |
| JP | 2001-74957 A * | 3/2001 |

(Continued)

*Primary Examiner*—Frank G. Font
*Assistant Examiner*—Ryan Lepisto
(74) *Attorney, Agent, or Firm*—Westerman, Hattori, Daniels & Adrian, LLP.

(57) ABSTRACT

A method for the preparation of an optical waveguide device characterized in that it comprises a first step for forming a first resin film on a substrate provided thereon with a lower clad layer; a second step for patterning the first resin film into a shape of an optical waveguide to thus form a core layer; a third step for forming a second resin film by coating the surfaces of the lower clad layer and the core layer with a solution containing a material for forming the second resin film according to the spin-coating method in such a manner that the thickness of the resulting film as measured from the upper surface of the lower clad layer and as determined after drying ranges from 3 to 10 times the thickness of the core layer and then drying the coated layer; and a fourth step for removing the second resin film in such a manner that the thickness of the second resin film as determined from the upper surface of the lower clad layer is less than 3 times that of the core layer and that the second resin film thus serves as the upper clad layer; and characterized in that in the third step, a means for controlling the evaporation rate of the solvent in the solution containing the material for forming the second resin film is provided. The method permits the production of an optical waveguide device made of a resin, which is free of air bubbles at the branched portion of the waveguide device, the air bubbles being adversely affecting the transmission efficiency of the optical waveguide.

10 Claims, 4 Drawing Sheets

FOREIGN PATENT DOCUMENTS

| | | | |
|---|---|---|---|
| JP | 2001-74961 A | * | 3/2001 |
| JP | 2002-71989 | | 3/2002 |
| JP | 2002-71989 A | * | 3/2002 |
| JP | 2002-311276 | | 10/2002 |
| JP | 2002-311276 A | | 10/2002 |
| JP | 2004-206016 | * | 7/2004 |

* cited by examiner (A)

(B)

(A)

(B)

METHOD FOR THE PREPARATION OF OPTICAL WAVEGUIDE DEVICES AND OPTICAL WAVEGUIDE DEVICES

This application is a continuation of international application PCT/JP02/13668 filed on Dec. 26, 2002.

TECHNICAL FIELD

The present invention relates to a method for the preparation of an optical waveguide device and an optical waveguide device and more particularly to a method for the preparation of an optical waveguide device made of a resin and free of any air bubble, which may adversely affect the transmission efficiency of the optical waveguide as well as an optical waveguide device.

BACKGROUND ART

As the recent wide spread of personal computers and internet communication, the demand for the transmission of information has rapidly been increased. For this reason, there has been desired for the spread of the optical transmission means whose transmission speed is quite high even to the terminal information processing devices such as personal computers. It is thus necessary that a high quality optical waveguide for the optical interconnection should be produced in a large scale at a low price.

As materials for forming optical waveguides, there have been known inorganic materials such as glass and semiconductor materials and resins. An optical waveguide of an inorganic material is in general produced according to a method, which comprises the steps of forming a film of an inorganic material using a film-forming device such as a vacuum vapor deposition device or a sputtering device and then etching the inorganic film thus formed into an optical waveguide having a desired shape. However, the vacuum vapor deposition device or the sputtering device requires the use of an evacuation device and therefore, a large-sized and expensive apparatus should be used. Moreover, this method requires the use of an evacuation step and this makes the process more complicated. On the other hand, when preparing an optical waveguide using a resin, the film-forming process or coating and heating steps can be conducted under the atmospheric pressure and therefore, the method, which makes use of a resin, is advantageous in that quite simple device and process can be used.

Although, there have been known various kinds of resins, which can be used for forming the core and clad layers of an optical waveguide, those particularly expected are polyimides each having a high glass transition point (Tg) and excellent in the heat resistance among others. When forming the core and clad layers of an optical waveguide from a polyimide, the resulting optical waveguide would be expected as one having long-term reliability and an ability of withstanding soldering.

Such an optical waveguide of a polymer material can, for instance, be produced by a method comprising the steps of forming a lower clad layer on a substrate of, for instance, silicon; forming a first film of a resin on the lower clad layer; patterning the first resin film into a shape of a desired optical waveguide to thus form a core layer; coating the surfaces of the lower clad layer and the core layer with a solution containing a material for forming a second resin film according to the spin-coating method; and then drying the coated layer to thus form an upper clad layer consisting of the second resin film.

Thus, the use of resins as materials for forming clad and core layers would permit the production of an optical waveguide made of a resin by a simple production process, but air bubbles are sometimes formed at the boundary between the core layer and the upper clad layer and/or within the upper clad layer, in the area wherein at least two optical waveguides are arranged at quite narrow spaces encountered in, for instance, the branched portion of an optical waveguide having a Y-shaped branch. The generation of such air bubbles would adversely affect the transmission efficiency of the resulting optical waveguide.

DISCLOSURE OF THE INVENTION

It is an object of the present invention to provide a method for the preparation of an optical waveguide device made of a resin, which is free of any air bubble adversely affecting the transmission efficiency of the resulting optical waveguide.

It is another object of the present invention to provide an optical waveguide device made of a resin, which is an optical waveguide device, of a resin, having a branched portion and which is free of any air bubble in the branched portion, adversely affecting the transmission efficiency of the optical waveguide.

Accordingly, the present invention provides a method for the preparation of an optical waveguide made of a resin and an optical waveguide device of a resin, as will be detailed below.

1. A method for the preparation of an optical waveguide device characterized in that it comprises a first step for forming a first resin film on a substrate provided thereon with a lower clad layer; a second step for patterning the first resin film into a shape of an optical waveguide to thus form a core layer; and a third step for forming a second resin film by coating the surfaces of the lower clad layer and the core layer with a solution containing a material for forming the second resin film according to the spin-coating method in such a manner that the thickness of the resulting film as measured from the upper surface of the lower clad layer and as determined after drying ranges from 3 to 10 times the thickness of the core layer and then drying the coated layer; and characterized in that in the third step, a means for controlling the evaporation rate of the solvent in the solution containing the material for forming the second resin film is provided.

2. The method for the preparation of an optical waveguide device as set forth in the foregoing item 1, wherein the means for controlling the evaporation rate of the solvent in the solution containing the material for forming the second resin film comprises a drainage hole formed on the inner peripheral wall of a reservoir disposed on the same circumference as that on which a rotary cup fitted to a spin coater is arranged; and a means for making, zero, the rotational speed of the plane to which the solvent is applied relative to the velocity of the ambient atmosphere.

3. The method for the preparation of an optical waveguide device as set forth in the foregoing item 1 or 2, wherein the means for controlling the evaporation rate of the solvent in the solution containing the material for forming the second resin film is a solvent added to the reservoir placed on the same circumference as that on which the rotary cup fitted to the spin coater is arranged.

4. The method for the preparation of an optical waveguide device as set forth in any one of the foregoing items 1 to 3, wherein the method further comprises the step of adhering a wettability-improving solvent on the upper surfaces of the core layer and the lower clad layer, between the second step and the third step.
5. The method for the preparation of an optical waveguide device as set forth in any one of the foregoing items 1 to 4, wherein the method further comprises a fourth step for removing the second resin film in such a manner that the thickness of the second resin film as measured from the upper surface of the lower clad layer is less than 3 times that of the core layer and that the second resin film thus serves as the upper clad layer.
6. The method for the preparation of an optical waveguide device as set forth in any one of the foregoing items 1 to 5, wherein the means for removing the second resin film in such a manner that the thickness of the second resin film as determined from the upper surface of the lower clad layer is less than 3 times that of the core layer is dry etching, wet etching or abrasion using an abrasive.
7. The method for the preparation of an optical waveguide device as set forth in any one of the foregoing items 1 to 6, wherein the second resin film is removed in such a manner that the thickness thereof is less than 2 to 3 times that of the core layer.
8. An optical waveguide device made of a resin characterized in that it has a branched portion and that it is free of any air bubble, at the branched portion, which adversely affects the transmission efficiency of the optical waveguide.
9. The optical waveguide device as set forth in the foregoing item 8, wherein the second resin film is made of a fluorinated polyimide resin.

EXPLANATION OF REFERENCE NUMERALS

Figure 1:
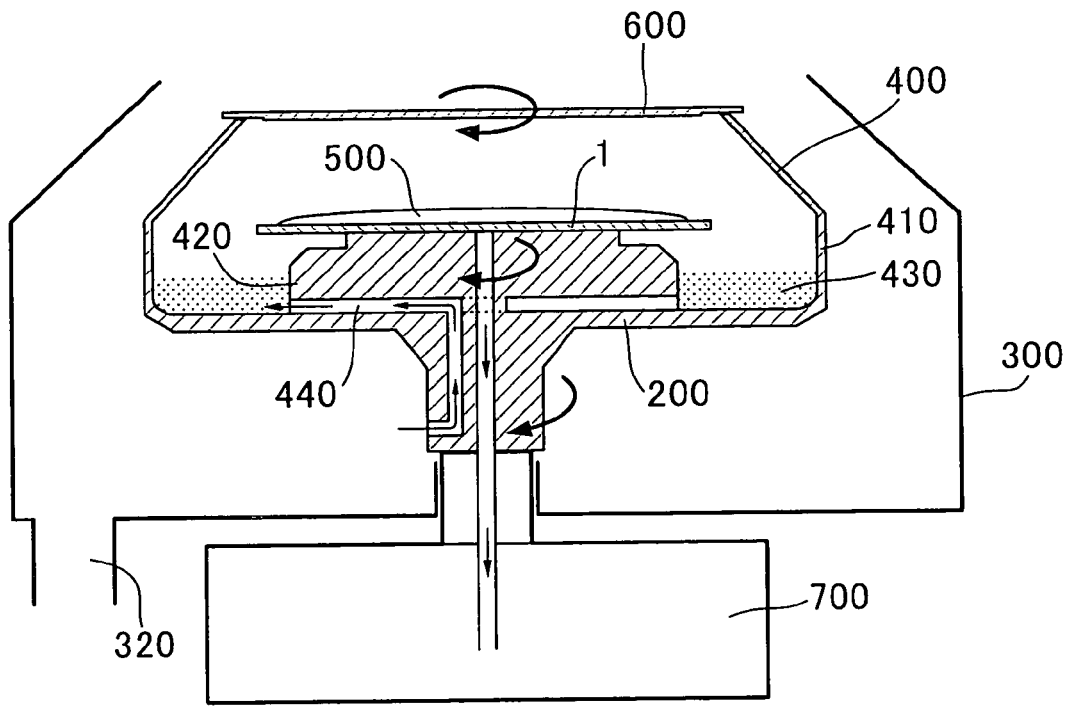
FIG. 1 is a diagram showing an example of a spin coater suitably used for the practice of the method according to the present invention; (A) is a cross sectional view of the device in its rotating state and (B) is a cross sectional view thereof at the standstill.
Figure 1:
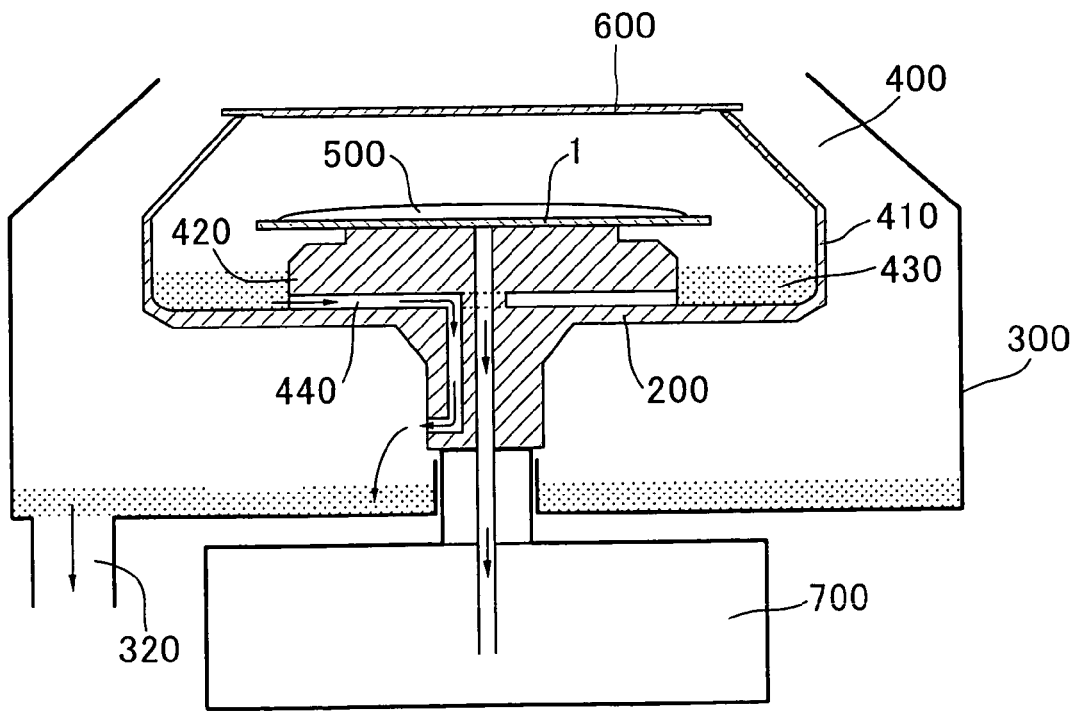

1. . . Silicon substrate; 3. . . Lower clad layer; 4. . . Core layer; 5. . . Upper clad layer; 6. . . Mask; 7. . . Electrode portion; 9. . . Protective layer; 10. . . Optical waveguide laminate; 51. . . Air bubble; 52. . . Base of branched portion; 100. . . Optical waveguide device; 200. . . Rotor; 300. . . Open top circular container; 310. . . Reservoir; 320. . . Drainage hole; 400. . . Rotary cup; 410. . . Outer peripheral wall; 420. . . Inner peripheral wall; 430. . . Reservoir; 440. . . Drainage hole; 500. . . Coating solution; 600. . . Cover for airtight seal; 700. . . Evacuation device for sucking wafers.

BEST MODE FOR CARRYING OUT THE INVENTION

An embodiment of the present invention will be detailed below with reference to the accompanying drawings.

First of all, the construction of the optical waveguide device 100 of the present invention will be described below referring to FIGS. 3 and 4. The optical waveguide device 100 of the present invention has such a construction that an optical waveguide laminate 10 is provided on a silicon wafer 1 and that electrodes 7 or the like are arranged in the region free of any optical waveguide laminate 10.

The optical waveguide laminate 10 comprises a lower clad layer 3 formed on the surface of a silicon wafer substrate 1; a core layer 4 of a ridge-shaped optical waveguide having a Y-shaped branch and formed on the lower clad layer; an upper clad layer 5 in which the core layer 4 is embedded; and a protective layer 9.

Both of the lower clad layer 3 and the upper clad layer 5 are formed from a first polyimide resin, the thickness of the lower clad layer 3 is about 6 μm and that of the upper clad layer 5 is about 12 μm as determined from the surface of the lower clad layer 3. The core layer 4 is formed from a second polyimide resin and it has a thickness of about 6 μm and a width of about 6 μm. The protective layer 9 is formed from a third polyimide resin film and the thickness thereof is about 5 μm as determined at the edge apart from the core layer 4. An electrode portion 7 is an electrode on which a light-emitting element or a light-receiving element is installed.

Figure 5:
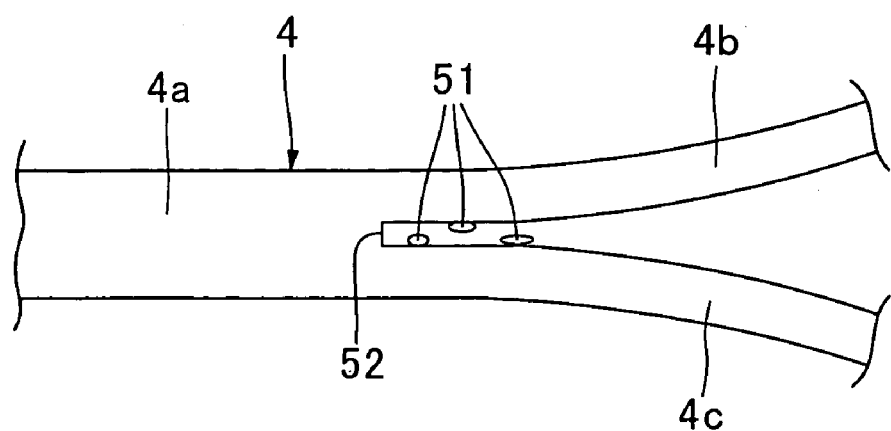
FIG. 5 is an expanded top plan view showing the shape imparted to the branched portion of the core layer 4 of an optical waveguide device.

The core layer 4 (optical waveguide) of the optical waveguide device according to the present invention comprises, as shown in FIG. 5, a core layer 4a and a Y-shaped portion 52 of the core layer 4a, which is branched into two directions or divided into core layers 4b and 4c. The thickness of the core layer 4a is about 6 μm.

An optical waveguide device having the foregoing structure is produced using, for instance, a spin coater as shown in FIGS. 2(A) and 2(B). The spin coater as shown in FIG. 2(A) is provided with a rotor 200 and an open top circular container 300, a rotary cup 400 is fitted to the rotor 200, and a substrate 1 is placed at the tip of the rotor 200 and fixed thereto through suction by a wafer-absorbing evacuation device 700. A coating liquid is dropwise added onto the substrate 1 or a resin film (and optionally electrodes and/or other elements) formed on the substrate 1, the rotary cup 400 is airtightly closed by a cover 600 for airtight sealing, and when the rotor 200 is then rotated, the coating liquid 500 is uniformly spread on the substrate by the action of the centrifugal force to thus form a resin film thereon. At this stage, a part of the coating liquid 500 and the evaporated solvent are dropped into a reservoir 430 of the rotary cup 400 by the action of the centrifugal force and further discharged through drainage holes 440 formed on the outer peripheral wall of the rotary cup 400. In this case, the velocity of the coating liquid 500 relative to that of the atmosphere within the rotary cup 400 is zero during the formation of the resin film, but the internal pressure of the rotary cup 400 is reduced when the coating liquid or the like is discharged through the drainage holes 440, the evaporation rate of the solvent is accelerated and this correspondingly leads to the generation of air bubbles 51 in the proximity to the branched portion 52 having a Y-shape as shown in FIG. 5.

On the other hand, the spin coater as shown in FIG. 2(B) is provided with a rotor 200 and an open top circular container 300, a substrate 1 is placed at the tip of the rotor 200 and fixed thereto through suction by a wafer-sucking evacuation device 700. A coating liquid is dropwise added onto the substrate 1 or a resin film (and optionally electrodes and/or other elements) formed on the substrate 1, the container 300 is airtightly closed by a cover 600 for airtight sealing, and when the rotor 200 is then rotated, the coating liquid 500 is uniformly spread on the substrate by the action of the centrifugal force to thus form a resin film thereon. At this stage, a part of the coating liquid 500 and the evaporated solvent are dropped into a reservoir 310 of the container 300 by the action of the centrifugal force and further discharged through drainage holes 320 formed on the bottom of the container 300. An air flow is generated due to the relative velocity of the coating liquid 500 and the atmosphere within the container 300, the evaporation rate of the solvent is accelerated and this correspondingly leads to the generation of air bubbles 51 in the proximity to the branched portion 52 having a Y-shape as shown in FIG. 5.

One of the features of the present invention resides in that in the third step in which a second resin film is formed by applying a solution containing a material for forming the second resin film onto the surface of the lower clad layer 3 and the core layer 4 and then drying the coated liquid, a means for controlling the evaporation rate of the solvent in the solution containing the material for forming the second resin film is provided.

As means for controlling the evaporation rate of the solvent in the solution containing the material for forming the second resin film, there may be listed, for instance, (1) a combination of drainage holes 440 formed on the inner peripheral wall 420 of a reservoir 430 placed on the same circumference as that on which a rotary cup 400 fitted to a rotor 200 of a spin coater is arranged and a means for making, zero, the rotational speed of the plane to which the solvent is applied relative to the velocity of the ambient atmosphere; (2) the incorporation of a solvent, preferably one identical to that used in the solution containing the material for forming the second resin film into the reservoir 430 to thus increase the partial pressure of the solvent within the rotary cup 400 and a combination of the above means. It is also preferred to carry out an additional step of adhering a wettability-improving solvent on the upper surfaces of the core and lower clad layers, between the second step and the third step, in addition to these controlling means.

Drainage holes 440 are formed on the inner peripheral wall 420 of the reservoir 430 placed on the same circumference as that on which the rotary cup 400 is placed, the rotary cup 400 is airtightly closed using a cover 600 for airtight sealing and then the rotor 200 is rotated. Thus, the external air enters into the rotary cup 400 through the drainage holes 440 due to the centrifugal force to thus raise the pressure in the rotary cup, the velocity of the coating liquid 500 relative to the atmosphere within the rotary cup 400 becomes zero since the cup 400 is airtightly closed and therefore, it would be considered that the evaporation of the solvent is inhibited.

This inhibitory effect can further be improved by the preliminary incorporation of a solvent, preferably the solvent identical to that used in the solution containing the material for forming the second resin film such as N,N-dimethylacetamide into the reservoir 430. In this respect, it is sufficient to incorporate such a solvent into the reservoir in an amount on the order of 2 to 10 ml.

First Embodiment

The method for the preparation of an optical waveguide device of the present invention, which is equipped with the foregoing means (1), will hereunder be described in more detail with reference to the accompanying drawings, FIGS. 3(1) to 3(9).

First, a solution of a first polyimide precursor is applied onto the entire upper surface (FIG. 3(1)) of a silicon substrate 1 using a spin coater having a structure as shown in FIG. 1 to thus form a film of the solution, the film is dried with heating to remove the solvent through evaporation thereof and subsequently the film is further heated to a higher temperature to cure the resin and to thus form a lower clad layer 3 consisting of the first polyimide resin film (FIG. 3(2)).

Then a solution containing a second polyimide precursor is applied onto the resulting lower clad layer 3 using a spin coater to form a film of the solution, the film is dried with heating to remove the solvent through evaporation and subsequently the film is further heated to a higher temperature to cure the resin and to thus form a layer 4 of the second polyimide resin, which will subsequently be processed into a core layer 4 (FIG. 3(3)).

A resist is coated on the second polyimide resin film 4 using a spin coater, followed by drying, exposure to light and development of the resist to form a patterned resist layer 6. This patterned resist layer 6 is used as a mask for processing the second polyimide resin film 4 into a Y-shaped or branched core layer 4 (optical waveguide) (FIG. 3(4)).

Figure 3:
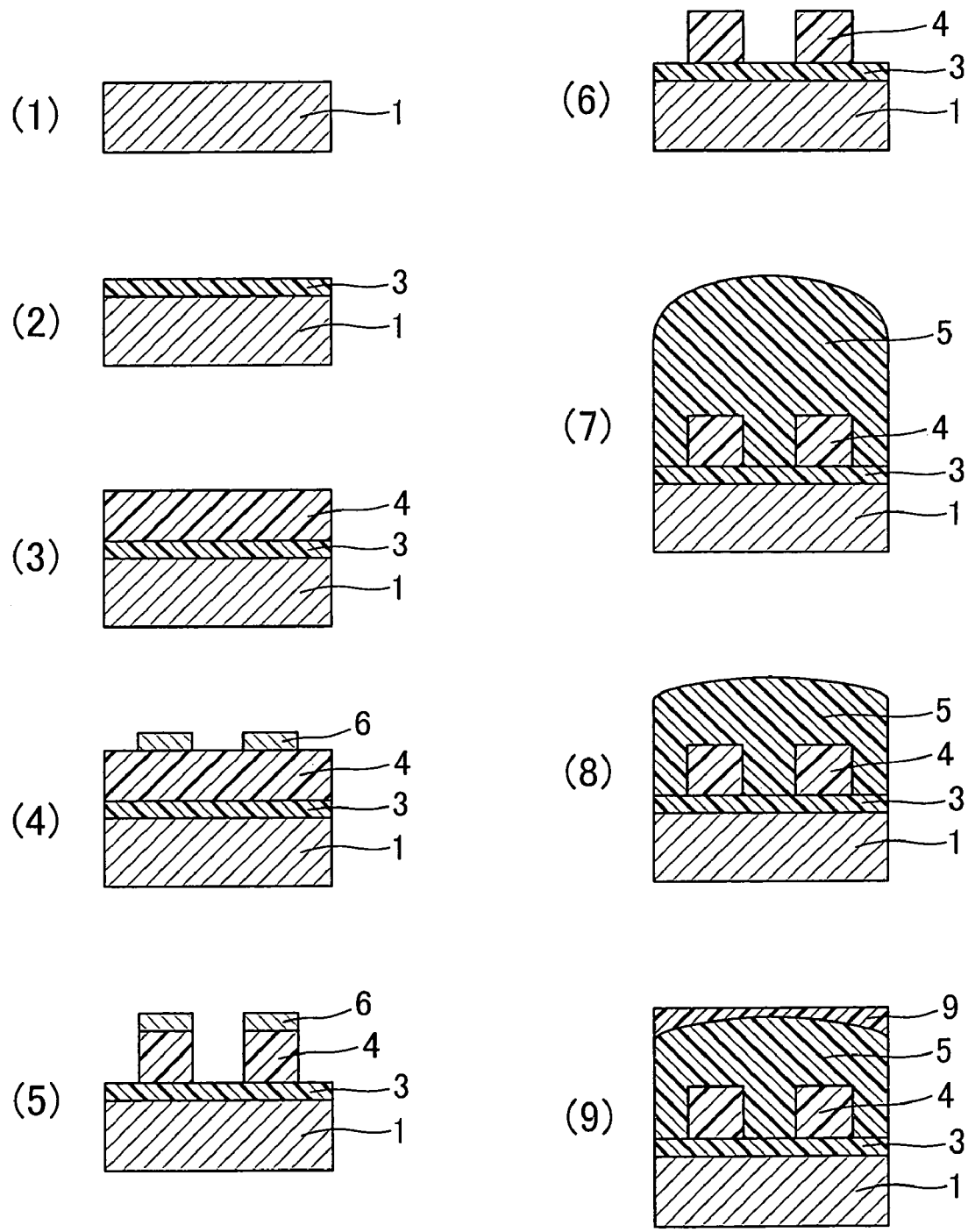
FIGS. 3(1) to 3(9) are a series of diagrams schematically showing an example of the method for the preparation of an optical waveguide device according to the present invention.
Figure 4:
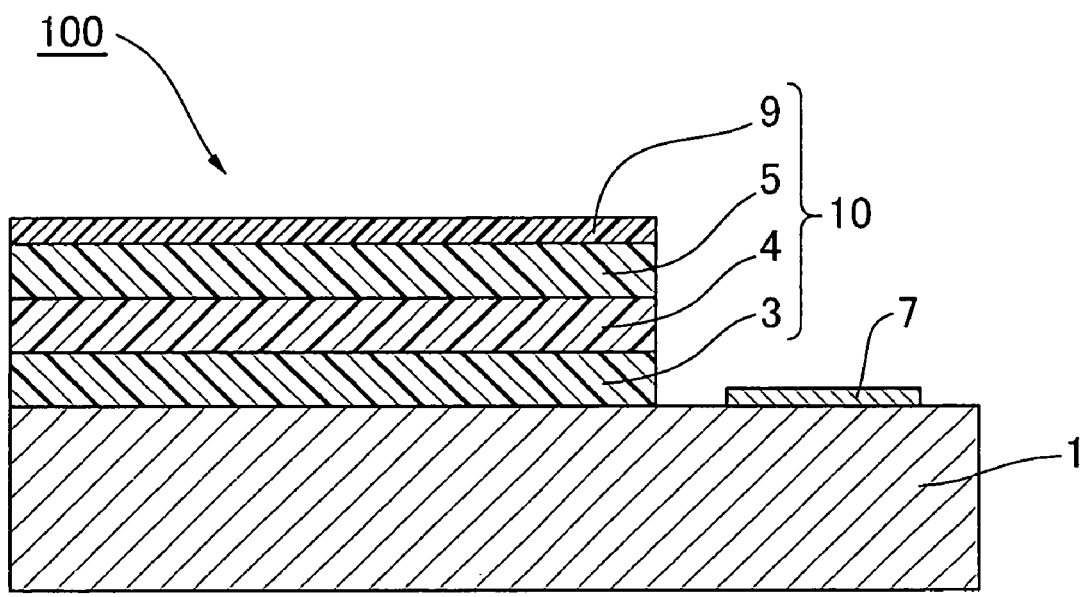
FIG. 4 is a cross sectional view schematically showing an optical waveguide device prepared by the method for the preparation thereof according to the present invention.

The second polyimide resin film 4 can be processed by the reactive ion etching technique using oxygen ($O_2$-RIE) through the resulting patterned resist layer 6 serving as a mask to form a branched type core layer 4 (FIG. 3(5)).

Thereafter, the patterned resist layer 6 is removed through peeling (FIG. 3(6)).

Figure 2:
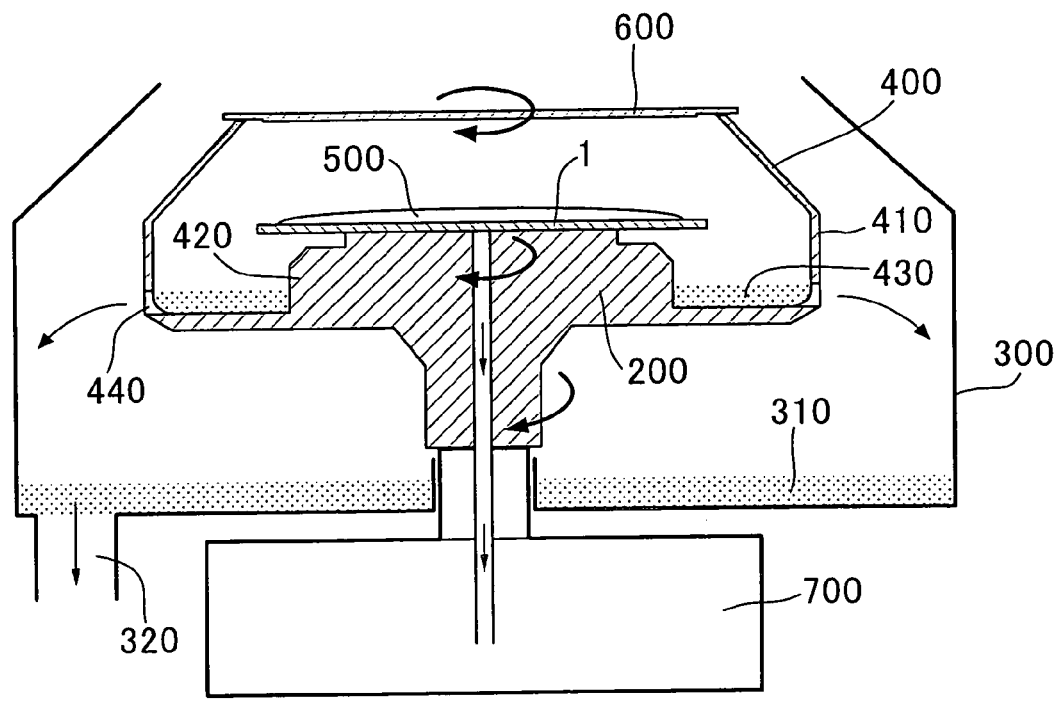
FIG. 2(A) is a diagram showing an example of a conventional spin coater (closed rotary cup-type one) and FIG. 2(B) is a diagram showing an example of a conventional spin coater (open type one).
Figure 2:
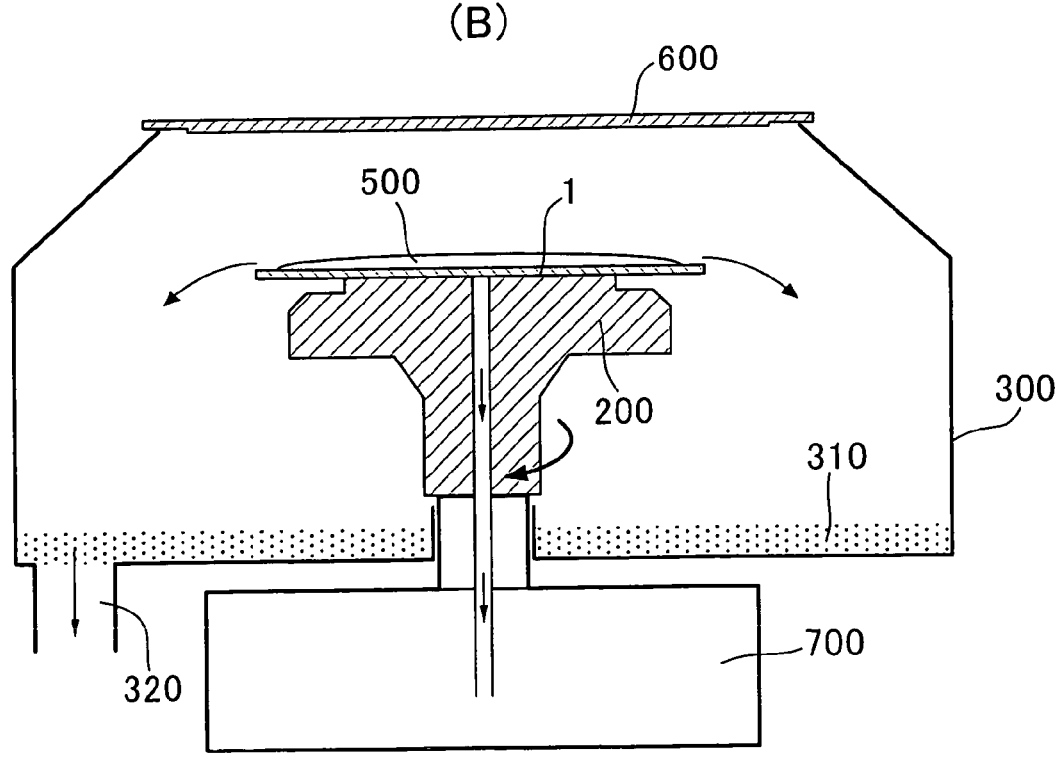

Then a solution containing the first polyimide precursor is applied onto the assembly in such a manner that the layer of the solution covers the core layer 4 and the lower clad layer 3 according to the spin coating. In this respect, the amount of the solution containing the first polyimide precursor to be applied is desirably higher than that required for forming an upper clad layer having a desired thickness, from the viewpoint of the prevention of the generation of any air bubble at the branched portion. When using, for instance, a spin coater having a structure as shown in FIG. 2, the thickness (determined after drying) of the first polyimide resin film 5 should be set at a level of not less than 5 times the thickness of the core layer 4, for instance, not less than about 30 μm (measured from the upper surface of the lower clad layer 3), in order to achieve the rate of excellent articles free of any air bubble equal to or higher than 95%.

In the present invention, however, a means for controlling the evaporation rate of the solvent from the solution containing the first polyimide precursor (the second solution containing the material for forming the second resin film) is provided and when using, for instance, a spin coater having a structure as shown in FIG. 1, the control of the solvent-evaporation rate would permit the reduction of the thickness (determined after drying) of the first polyimide resin film 5 as compared with the conventional methods. For this reason, it is sufficient that the thickness (determined after drying) of the first polyimide resin film 5 is set at a level of not less than 3.5 times the thickness of the core layer 4, for instance, not less than about 22 μm (measured from the upper surface of the lower clad layer 3), in order to achieve the rate of excellent articles free of any air bubble equal to or higher than 95% and therefore, the amount of the upper clad layer to be removed as will be detailed later can be reduced.

At this stage, it is more preferred to preliminarily incorporate a solvent, preferably a solvent identical to that used in the solution containing the first polyimide precursor such as N,N-dimethylacetamide into the reservoir 430 in an amount on the order of 2 to 10 ml.

Then the film of the solution containing the first polyimide precursor is dried with heating to thus evaporate the solvent and subsequently the film is further heated at a higher temperature to cure the resin and to thus form an upper clad layer 5 consisting of the first polyimide resin film (FIG. 3(7)).

Next, the first polyimide resin film subsequently processed into the upper clad layer 5 is removed in such a manner that the thickness of the first polyimide resin film as measured from the upper surface of the lower clad layer 3 is less than 3 times that of the core layer 4 to thus form an upper clad layer 5 consisting of the first polyimide resin film (FIG. 3(8)).

As means for the removal of the first polyimide resin film 5 to a thickness of less than 3 times that of the core layer 4, there may be listed, for instance, dry etching, wet etching and abrasion with an abrasive.

Examples of dry etching techniques are plasma etching, reactive ion etching, reactive sputter etching and ion beam etching techniques, with the reactive ion etching technique being preferred since this technique would permit the anisotropic etching. In these techniques, factors such as gas compositions, pressure, temperature, frequency and output can be controlled and these factors or conditions may appropriately be selected depending on individual purposes.

The wet etching is an etching technique, which makes use of a chemical reaction and which is carried out in a liquid phase. Examples of etching agents usable in this technique are acids such as hydrofluoric acid, alkalis such as alkali hydroxides and ethylene diamine, and oxidizing agents such as potassium permanganate. Examples of reaction methods are immersion (or dipping), the use of a running liquid, spraying, the use of a jet and electrolyzation, factors such as compositions of liquids, pH values thereof, viscosities, temperature, stirring conditions, treating time and processed surface area can be controlled in these reaction methods and these factors or conditions may appropriately be selected depending on individual purposes.

The present invention employs a polyimide resin and therefore, it is possible to use, for instance, an aqueous solution of potassium hydroxide or sodium hydroxide, a mixed solution containing hydrazine and isopropyl alcohol or an aqueous mixed solution containing ethylenediamine and pyrocatechol, after warming the solutions.

Examples of abrasives usable in the abrasion technique include colloidal silica, barium carbonate, iron oxide, calcium carbonate, silica, cerium oxide and diamond and examples of abrasion methods usable herein are mechanical and mechano-chemical abrasion methods. This abrasion technique is preferred because it can uniformly grind the surface, but cautions should be taken not to form abrasion marks (or defects) on the surface.

A third polyimide precursor is applied onto the upper surface of the upper clad layer 5, which had thus been etched to a desired thickness according to the spin coating method, the coated layer is dried with heating to thus evaporate the solvent and subsequently the layer is further heated at a higher temperature to cure the resin and to thus form a protective layer 9 whose upper surface is approximately flat, which has a thickness of 5 μm and which consists of the third polyimide resin film (FIG. 3(9)).

Then a cut is formed by dicing the laminate film comprising the protective layer 9, the upper clad layer 5, the core layer 4 and the lower clad layer 3 along the direction of the thickness of the laminate to thus remove, from the substrate 1, the portion extending from the protective layer to the lower clad layer, on which electrodes 7 will be formed later, through peeling. Thus the optical waveguide laminate 10 becomes a part of the structure as shown in FIG. 4 and, in the region for electrode portions 7 on the substrate 1, the electrode portions 7 and the silicon substrate 1 are exposed.

A metal alloy layer having a desired shape may be formed on the exposed electrode portions 7.

Thereafter, a wafer-like substrate 1 is cut out from the assembly thus formed by dicing and the side surfaces of the substrate are polished to thus complete an optical waveguide device 100.

Second Embodiment

The present invention is characterized in that, in the third step comprising applying a solution containing a material for forming a second resin film onto the surfaces of the lower clad layer 3 and the core layer 4 by the spin coating method and then drying the coated layer to form a second resin film, a means for controlling the evaporation rate of the solvent used in the solution containing the material for forming the second resin film is provided to thus prevent the generation of any air bubble at the branched portion of the core layer. In the present invention, it is also possible to combine the foregoing features of the present invention with a method for reducing the generation of any air bubble at the branched portion of the resulting optical waveguide, when applying a solution containing a material for forming the upper clad layer 5, by improving the wettability of the surfaces of the layers 3 and 4 with the solution.

This method will hereunder be described in detail.

A core layer is likewise formed on a substrate 1 according to the processes as shown in FIG. 3(1) to FIG. 3(6). Then prior to the step for forming an upper clad layer 5, the upper surface of the lower clad layer 3 and the side and upper surfaces of the core layer 4 are subjected to a treatment for the improvement of the wettability thereof with the solution containing a material for forming the upper clad layer 5. This treatment is one comprising the step of applying the solvent used in the solution containing a material for forming the upper clad layer 5 or a solvent for reducing the surface tension of the upper surface of the lower clad layer 3 and the upper surface of the core layer 4 including the side surfaces thereof onto these upper and side surfaces. In this embodiment, the upper and side surfaces are coated with N,N-dimethylacetamide as the solvent used in the solution containing a material for forming the upper clad layer 5. Examples of methods usable herein for coating the solvent are spin-coating methods, dipping methods (the assembly is dipped in the solvent) and whirler methods (spraying the assembly with the solvent). Alternatively, the substrate 1 is placed in a container filled with the vapor of the solvent to thus adhere the solvent vapor to the surfaces of the substrate 1 to be treated, instead of coating the surfaces with the solvent. In this connection, the container can be filled with the vapor by, if necessary, reducing the pressure within the container or by heating the solvent, while taking into consideration the vapor pressure of the solvent.

The solution containing the material for forming the upper clad layer 5 is applied onto the core layer 4 and the lower clad layer 3, which are coated with the solvent or treated with the solvent vapor, according to the spin-coating method while the layers 3 and 4 are still wetted with the solvent. Thus, the solution containing the material for forming the upper clad layer 5 covers the core layer 4 and wets and spreads throughout the lower clad layer 3. Accordingly, the solution can penetrate into the interstice between the core layers 4b and 4c at the branched portion 52 of the core layer 4 or completely embed even the interstice of the core layer 4. In addition, air bubbles are hardly caught up into the assembly thus formed because of its high wettability. Thereafter, the film of the solution is heated to evaporate the solvent and then the film is further heated at a higher temperature to thus form an upper clad layer 5 made of the first polyimide film (FIG. 3(7)).

Subsequently, the same procedures used in the first embodiment are repeated to complete an optical waveguide device.

In this embodiment, the solution containing the material for forming the upper clad layer 5 is coated after the upper surfaces of the lower clad layer 3 and the core layer 4 are subjected to a treatment for the improvement of the wettability of the surfaces and therefore, any insufficient filling-up of the branched portion of the core layer 4 having a Y-shaped branch with the foregoing solution is scarcely observed and air bubbles are hardly caught up into the assembly when the solution wets and spreads over the assembly. Accordingly, the present invention would be able to reduce the probability of air bubble-generation in the upper clad layer 5.

After the foregoing step for improving the wettability of the surfaces of the lower clad layer and the core layer, the solution containing the material for forming the upper clad layer 5 is applied onto these layers while the upper surfaces of the core layer 4 and the lower clad layer 3 are still wetted with the foregoing solvent, but the solution may be applied thereto after the solvent is removed through drying. The results of experiments carried out by the inventors of this invention clearly indicate that the wettability of these surfaces is improved even when the solvent is removed by drying. Accordingly, it would be supposed that this is because certain changes are induced on the surface layer of the polyimide film constituting the core layer 4 and the lower clad layer 3 by once wetting the surfaces thereof with a solvent.

In this connection, solvents of surface tension-reducing solvent used for improving the wettability thereof are not restricted to those listed above and may be another solvent or solvents. For instance, N-methyl pyrrolidone can be used as such a solvent.

EXAMPLES 1 TO 6 AND COMPARATIVE EXAMPLES 1 TO 4

An optical waveguide device was prepared using a silicon substrate having a diameter of 125 mm according to the first embodiment. Using spin coaters as shown in FIG. 1 (closed rotary cup type one) and FIG. 2(B) (open type one), the amount of a solution containing a first polyimide precursor to be applied onto the surface of a lower clad layer 3 and a core layer 4 was changed to form upper clad layers 5 having a variety of thicknesses, followed by the removal of the upper clad layers in such a manner that the thickness thereof as determined from the upper surface of the lower clad layer 3 was less than 3 times that of the core layer 4 to thus give an upper clad layer 5 and further the formation of a protective layer 9. Components for each layer and conditions for drying and curing treatment used are as follows.

Lower Clad Layer 3 and Upper Clad Layer 5: Polyimide films formed using a first polyimide precursor (OPI-N1005 (trade name) available from Hitachi Chemical Co., Ltd.) (the solvent was evaporated by heating at 100° C. for 30 minutes and then 200° C. for 30 minutes and the film was cured by heating at 370° C. (350° C. for the upper clad layer 5) for 60 minutes; the thickness of the lower clad layer 3: about 6 μm; the thickness of the upper clad layer 5: see the following Table 1).

Core Layer 4: A polyimide film formed using a second polyimide precursor (OPI-N3205 (trade name) available from Hitachi Chemical Co., Ltd.) (the solvent was evaporated by heating at 100° C. for 30 minutes and then 200° C. for 30 minutes and the film was cured by heating at 350° C. for 60 minutes; the thickness thereof: about 6 μm; the width thereof: about 6 μm).

Protective Layer 9: A polyimide film formed using a third polyimide precursor (PIX-6400 (trade name) available from Hitachi Chemical DuPont Microsystems Co., Ltd.) (the solvent was evaporated by heating at 100° C. for 30 minutes and then 200° C. for 30 minutes and the film was cured by heating at 350° C. for 60 minutes; the thickness thereof: about 5 μm as determined at an edge portion apart from the core layer 4).

The branched portion 52 of the core layer 4 (optical waveguide) for the optical waveguide device 100 was observed under a microscope to thus confirm whether or not any air bubble was present in the interstice between the core layer (optical waveguide) 4b and the core layer (optical waveguide) 4c (see FIG. 5). Coating conditions for forming the upper clad layer 5, the thicknesses of the dried films and the rate of air bubble-free excellent articles are summarized in the following Table 1. In this respect, the rate of air bubble-free excellent articles (REA (%) in Table 1) herein used means the percentage of the number of optical waveguide devices formed on a wafer substrate and free of any air bubble in the branched portion having a Y-shape with respect to the total number of optical waveguide devices formed on the wafer substrate.

TABLE 1

| No. | Spin Coater | Coating Conditions | Thickness (μm) | REA (%) |
|---|---|---|---|---|
| 1 | FIG. 1 (present invention) | 450 rpm/30 s + 1600 rpm/0 s | 38.6 | 93.8 |
| 2 | FIG. 1 (present invention) | 650 rpm/30 s + 1600 rpm/0 s | 27.2 | 97.1 |
| 3 | FIG. 1 (present invention) | 850 rpm/30 s + 1600 rpm/0 s | 22.8 | 97.6 |
| 4 | FIG. 1 (present invention) | 500 rpm/10 s + 1000 rpm/30 s | 20.9 | 71.0 |
| 5 | FIG. 1 (present invention) | 500 rpm/10 s + 1200 rpm/30 s | 18.3 | 42.3 |
| 6 | FIG. 1 (present invention) | 500 rpm/10 s + 1570 rpm/30 s | 13.9 | 21.0 |
| 1 | FIG. 2(B) (Comp. Ex.) | 450 rpm/30 s + 1600 rpm/0 s | 30.0 | 98.0 |
| 2 | FIG. 2(B) (Comp. Ex.) | 800 rpm/60 s | 22.0 | 40.9 |
| 3 | FIG. 2(B) (Comp. Ex.) | 1000 rpm/60 s | 18.8 | 26.8 |
| 4 | FIG. 2(B) (Comp. Ex.) | 500 rpm/10 s + 1800 rpm/30 s | 15.5 | 12.5 |

REA (%): Rate of air bubble-free excellent articles.

In the foregoing Table, "450 rpm/30 s+1600 rpm/0 s" means that the spin coater is maintained at a rotational frequency of 450 rpm for 30 seconds and then the rotational frequency thereof is increased up to 1600 rpm and it is maintained for 0 second and thereafter the spin coater is stopped. Similarly, the above applies to other examples.

As will be seen from the data listed in Table 1, it is necessary that the thickness of the upper clad layer upon the formation thereof must be not less than about 30 μm in order to achieve the rate of air bubble-free excellent articles of not less than 95% in the coating method using the conventional open type rotor (FIG. 2(B)). Contrary to this, when using a spin coater as shown in FIG. 1 provided with a means for controlling the evaporation rate of a solvent, it is sufficient that the thickness of the coated upper clad layer upon the formation thereof is set at a level of not less than about 22 μm in order to achieve the rate of air bubble-free excellent articles of not less than 95%, this in turn reduces the quantity of the upper clad layer to be etched back to obtain an upper clad layer 5 having a desired thickness and the production time can thus be saved.

As will be clear from FIG. 5, air bubbles 51 are mainly generated within the region extending from the base 52 of the branched portion to the portion about 50 μμm apart from the base. It would be supposed that this is because the interstice between the core layer 4b (optical waveguide) and the core layer 4c (optical waveguide) is closed at the base 52 of the branched portion of the core layer and therefore, the solution containing the material for forming the upper clad layer 5 cannot sufficiently penetrate into the interstice and the interstice is thus insufficiently filled up with the solution.

Moreover, in the optical waveguide device according to this embodiment, all of the layers constituting the device from the lower clad layer 3 to the protective layer 9 are made of polyimide and therefore, the device has a high Tg and is excellent in the heat resistance. For this reason, the optical waveguide device according to this embodiment can maintain its transmission characteristics even at a high temperature. In addition, the polyimide can withstand a high temperature-processing step such as the soldering step and therefore, it is possible to attach another optical waveguide device, an electric circuit element and/or a light-receiving element through soldering.

Although all of the layers constituting the optical waveguide device from the lower clad layer 3 to the protective layer 9 are made of polyimide films in the foregoing embodiment, the protective layer 9 may likewise be formed from not only resins, but also inorganic materials such as $SiO_2$. When the protective layer 9 is formed from an inorganic film, the protective layer 9 can be prepared by any known film-forming method such as the CVD technique or the vapor deposition technique. Moreover, the protective layer may likewise be formed according to the solution-applying method such as the SOG technique.

EXAMPLE 7

In this Example, the generation of air bubbles was inhibited by the improvement of the wettability of the surfaces of a lower clad layer and a core layer prior to the coating of a solution containing a material for forming an upper clad layer 5.

A core layer 4 was formed on a substrate 1 according to the steps as shown in FIGS. 3(1) to 3(6) similar to those used in Example 1.

Then the upper surface of the lower clad layer 3 and the upper and side surfaces of the core layer 4 were subjected to the following treatments using N,N-dimethylacetamide as the solvent used in a solution containing a material for forming an upper clad layer 5, prior to the step for forming the upper clad layer 5: a treatment in which the solvent was spin-coated (10 ml per wafer) using a spin coater as shown in FIG. 1; a treatment in which a container was filled with the vapor of the solvent and the wafer was allowed to stand (at 23° C. for 2 hours) in the container; and a treatment in which a container was filled with the vapor of the solvent, followed by reducing the pressure and allowing the wafer to stand therein (at 23° C. and 0.05 MPa for 2 hours).

A solution containing OPI-N1005 as a material for forming an upper clad layer 5 was applied onto the core layer 4 and the lower clad layer 3 by the spin-coating method in such a manner that the thickness of the resulting dry film as determined from the upper surface of the lower clad layer 3 was 3.9 times that of the core layer 4. Then the solvent present in the solution applied was evaporated off by heating the assembly, in a dryer, at 100° C. for 30 minutes and then 200° C. for 30 minutes and the assembly was further heated at 350° C. for 60 minutes to thus form an upper clad layer 5 of a polyimide resin film (FIG. 3(7)). Subsequently, the same procedures used in the first embodiment were repeated to complete an optical waveguide device. The rate of air bubble-free excellent articles observed for the resulting device was examined using a microscope.

As a result, it was found that the rates of air bubble-free excellent articles were improved when the samples were subjected to the foregoing treatments: the treatment in which the solvent was spin-coated on each sample, the treatment in which the sample was allowed to stand in the vapor of the solvent; or the treatment in which each sample was treated with the vapor of the solvent (under reduced pressure) as compared with the samples free of such treatments.

INDUSTRIAL APPLICABILITY

The present invention is characterized in that the generation of air bubbles in the vicinity of the branched portion of an optical waveguide device is prevented by forming the upper clad layer 5 in a thickness higher than a desired one and that the excess of the material required for forming the layer 5 is reduced as compared with that used in the conventional method. Accordingly, the present invention permits the reduction of the processing time required for etching back the excess upper clad layer 5 to a desired thickness. Moreover, the upper clad layer 5 is formed in a higher thickness, the clad layer 5 is then removed in such a manner that the thickness thereof as determined from the upper surface of the lower clad layer 3 is less than 3.5 times that of the core layer 4 and therefore, the upper surface of the upper clad layer 5 becomes smoother. When the etch back processing is carried out using the RIE technique, the difference in the height between the upper surface and central portion of the core layer ranges from 3 to 4 μm in the conventional technique, but the difference in the height is reduced to a level of 1 to 1.5 μm, which is ⅓ time that of the former. For this reason, the surfaces of the protective layer 9 and the upper clad layer 5 are correspondingly smooth, this is quite convenient when it is intended to further increase the number of layers laminated and this would permit the reduction of the thickness of the protective layer 9. The optical waveguide shows a sufficient transmission efficiency when the thickness of the upper clad layer 5 is on the order of 2 times that of the core layer 4 and accordingly, it is preferred to remove the second resin film 5 in such a manner that the thickness of the resin film is less than 2 to 3.5 times that of the core layer 4.

Although there have been described, in the foregoing embodiments, structures for reducing the generation of air bubbles at the branched portion of an optical waveguide having a Y-shaped branch and methods for the production thereof, the foregoing structures and the production methods can likewise be applied to the production of the fine structure portions of optical waveguides having fine structures, in addition to the production of optical waveguides having a Y-shaped branch. The foregoing structures and the production methods can be applied to the production of, for instance, an optical waveguide branched into 3 ways or more, a directional coupler wherein at least two optical waveguides are arranged in close vicinity to one another at quite small spaces and an optical switch in which at least two optical waveguides intersect each other, from resins.

As has been described above in detail, the present invention can provide an optical waveguide device of a resin having a branched portion, which hardly generates air bubbles at the branched portion of the optical waveguide device.

The invention claimed is:

1. A method for the preparation of an optical waveguide device comprising:
   (a) a first step for forming a first resin film on a substrate provided thereon with a lower clad layer;
   (b) a second step for patterning the first resin film into a shape of an optical waveguide to thus form a core layer; and
   (c) a third step for forming a second resin film by
      (c1) coating the surfaces of the lower clad layer and the core layer with a solution containing a material for forming the second resin film according to the spin-coating method in such a manner that the thickness of the resulting film as measured from the upper surface of the lower clad layer and as determined after drying ranges from 3 to 10 times the thickness of the core layer and then
      (c2) drying the coated layer;
   (d) wherein in the step (c1) of the third step (c), a means for controlling the evaporation rate of a solvent in the solution containing the material for forming the second resin film is provided.

2. The method for the preparation of an optical waveguide device as set forth in claim 1, wherein the means for controlling the evaporation rate of the solvent in the solution containing the material for forming the second resin film comprises a drainage hole formed on the inner peripheral wall of a reservoir disposed on the same circumference as that on which a rotary cup fitted to a spin coater is arranged; and a means for making, zero, the rotational speed of the plane to which the solvent is applied relative to the velocity of the ambient atmosphere.

3. The method for the preparation of an optical waveguide device as set forth in claim 1, wherein the means for controlling the evaporation rate of the solvent in the solution containing the material for forming the second resin film is a solvent added to a reservoir placed on the same circumference as that on which a rotary cup fitted to a spin coater is arranged.

4. The method for the preparation of an optical waveguide device as set forth in claim 3, wherein the means for controlling the evaporation rate of the solvent in the solution containing the material for forming the second resin film is a solvent added to the reservoir placed on the same circumference as that on which the rotary cup fitted to the spin coater is arranged.

5. The method for the preparation of an optical waveguide device as set forth in claim 1 or 2, wherein the method further comprises the step of adhering a wettability-improving solvent on the upper surfaces of the core layer and the lower clad layer, between the second step and the third step.

6. A method for the preparation of an optical waveguide device comprising:
   a first step for forming a first resin film on a substrate provided thereon with a lower clad layer;
   a second step for patterning the first resin film into a shape of an optical waveguide to thus form a core layer; and
   a third step for forming a second resin film by coating the surfaces of the lower clad layer and the core layer with a solution containing a material for forming the second resin film according to the spin-coating method in such a manner that the thickness of the resulting film as measured from the upper surface of the lower clad layer and as determined after drying ranges from 3 to 10 times the thickness of the core layer and then drying the coated layer;
   wherein in the third step, a means for controlling the evaporation rate of a solvent in the solution containing the material for forming the second resin film is provided, and
   wherein the method further comprises a fourth step for removing the second resin film in such a manner that the thickness of the second resin film as determined from the upper surface of the lower clad layer is less than 3 times that of the core layer and that the second resin film thus serves as the upper clad layer.

7. The method for the preparation of an optical waveguide device as set forth in claim 6, wherein the means for removing the second resin film in such a manner that the thickness of the second resin film as determined from the upper surface of the lower clad layer is less than 3 times that of the core layer is dry etching, wet etching or abrasion using an abrasive.

8. The method for the preparation of an optical waveguide device as set forth in claim 7, wherein the second resin film is removed in such a manner that the thickness thereof is less than 2 to 3 times that of the core layer.

9. The method for the preparation of an optical waveguide device as set forth in claim 6, wherein the second resin film is removed in such a manner that the thickness thereof is less than 2 to 3 times that of the core layer.

10. The method for the preparation of an optical waveguide device as set forth in claim 6, wherein the means for controlling the evaporation rate of the solvent in the solution containing the material for forming the second resin film comprises a drainage hole formed on the inner peripheral wall of a reservoir disposed on the same circumference as that on which a rotary cup fitted to a spin coater is arranged; and a means for making zero, the rotational speed of the plane to which the solvent is applied relative to the velocity of the ambient atmosphere.

* * * * *